(12) United States Patent
Assadollahi (10) Patent No.: US 8,117,540 B2
(45) Date of Patent: Feb. 14, 2012

(54) METHOD AND DEVICE INCORPORATING IMPROVED TEXT INPUT MECHANISM

(75) Inventor: Ramin O Assadollahi, Munich (DE)

(73) Assignee: Neuer Wall Treuhand GmbH, Hamburg (DE)

( * ) Notice: Subject to any disclaimer, the term of this patent is extended or adjusted under 35 U.S.C. 154(b) by 895 days.

(21) Appl. No.: 11/940,400

(22) Filed: Nov. 15, 2007

(65) Prior Publication Data

US 2008/0072143 A1 Mar. 20, 2008

Related U.S. Application Data

(63) Continuation-in-part of application No. 11/560,668, filed on Nov. 16, 2006, and a continuation-in-part of application No. 11/131,867, filed on May 18, 2005.

(51) Int. Cl.
*G06F 17/00* (2006.01)

(52) U.S. Cl. .................................. 715/256; 715/260

(58) Field of Classification Search .......... 715/259–261, 715/256, 257
See application file for complete search history.

(56) References Cited

U.S. PATENT DOCUMENTS

| | | | |
|---|---|---|---|
| 5,109,352 A | 4/1992 | O'Dell | |
| 5,818,437 A | 10/1998 | Grover et al. | |
| 5,945,928 A | 8/1999 | Kushler et al. | |
| 5,953,541 A | 9/1999 | King et al. | |
| 6,005,495 A | 12/1999 | Connolly et al. | |
| 6,011,554 A | 1/2000 | King et al. | |
| 6,219,731 B1 | 4/2001 | Gutowitz | |
| 6,286,064 B1 | 9/2001 | King et al. | |
| 6,307,548 B1 | 10/2001 | Flinchem et al. | |
| 6,307,549 B1 | 10/2001 | King et al. | |
| 6,405,060 B1 * | 6/2002 | Schroeder et al. | 455/566 |
| 6,473,006 B1 | 10/2002 | Yu et al. | |
| 6,636,162 B1 | 10/2003 | Kushler et al. | |
| 6,646,573 B1 | 11/2003 | Kushler et al. | |
| 6,712,534 B2 | 3/2004 | Patel | |
| 6,955,602 B2 | 10/2005 | Williams | |
| 7,075,520 B2 | 7/2006 | Williams | |
| 7,111,248 B2 | 9/2006 | Mulvey et al. | |
| 7,319,957 B2 | 1/2008 | Robinson et al. | |

(Continued)

FOREIGN PATENT DOCUMENTS

CA 2601859 6/2000

(Continued)

OTHER PUBLICATIONS

EP Search Report Application 06024049.6.

(Continued)

*Primary Examiner* — Stephen Hong
*Assistant Examiner* — Manglesh Patel
(74) *Attorney, Agent, or Firm* — Jonathan Feuchtwang (57) ABSTRACT

The invention relates to a method and device incorporating an improved text input mechanism. The text input method comprising the steps determining a list of candidates for the present context, a candidate being a possible textual continuation of the present context and having a relevance score assigned; arranging the candidates in groups, each group having a group designator; displaying the group designators; prompting the user to select a group and receiving the user selection; displaying candidates of the selected group, the displayed candidates being arranged according to their respective scores; prompting the user to select a candidate and receiving the user selection; accepting the selected candidate as text input and updating the context.

29 Claims, 4 Drawing Sheets

```
It is really s|
```

!. ≈ T E U O H I P A C L sick
simple
simply
silly
similar

U.S. PATENT DOCUMENTS

| | | | |
|---|---|---|---|
| 7,395,203 B2* | 7/2008 | Wu et al. | 704/235 |
| 7,480,619 B1 | 1/2009 | Scott | |
| 7,580,829 B2 | 8/2009 | James et al. | |
| 7,580,925 B2 | 8/2009 | Unruh et al. | |
| 7,587,378 B2 | 9/2009 | Van Meurs | |
| 7,610,194 B2 | 10/2009 | Bradford et al. | |
| 7,679,534 B2 | 3/2010 | Kay et al. | |
| 7,712,053 B2 | 5/2010 | Bradford et al. | |
| 7,720,682 B2 | 5/2010 | Stephanick et al. | |
| 7,840,579 B2 | 11/2010 | Samuelson et al. | |
| 2002/0021311 A1 | 2/2002 | Shechter et al. | |
| 2002/0075323 A1 | 6/2002 | O'Dell | |
| 2002/0078106 A1 | 6/2002 | Carew et al. | |
| 2002/0126097 A1 | 9/2002 | Savolainen | |
| 2002/0152203 A1 | 10/2002 | Ostergaard et al. | |
| 2002/0180689 A1 | 12/2002 | Venolia | |
| 2002/0196163 A1* | 12/2002 | Bradford et al. | 341/22 |
| 2003/0011574 A1 | 1/2003 | Goodman | |
| 2003/0023420 A1 | 1/2003 | Goodman | |
| 2003/0030573 A1 | 2/2003 | Ure | |
| 2003/0054830 A1 | 3/2003 | Williams et al. | |
| 2003/0064686 A1 | 4/2003 | Thomason et al. | |
| 2003/0097252 A1 | 5/2003 | Mackie | |
| 2003/0104839 A1 | 6/2003 | Kraft et al. | |
| 2003/0107555 A1 | 6/2003 | Williams | |
| 2003/0144830 A1 | 7/2003 | Williams | |
| 2004/0017946 A1 | 1/2004 | Longe et al. | |
| 2004/0024584 A1 | 2/2004 | Brill | |
| 2004/0056844 A1 | 3/2004 | Gutowitz et al. | |
| 2004/0140956 A1 | 7/2004 | Kushler et al. | |
| 2004/0153963 A1 | 8/2004 | Simpson et al. | |
| 2004/0153975 A1 | 8/2004 | Williams et al. | |
| 2004/0176114 A1 | 9/2004 | Northcutt | |
| 2005/0017954 A1 | 1/2005 | Kay et al. | |
| 2005/0043949 A1 | 2/2005 | Roth et al. | |
| 2005/0060448 A1 | 3/2005 | Gutowitz | |
| 2005/0114770 A1 | 5/2005 | Sacher et al. | |
| 2005/0188330 A1* | 8/2005 | Griffin | 715/816 |
| 2005/0192802 A1 | 9/2005 | Robinson et al. | |
| 2005/0283358 A1 | 12/2005 | Stephanick et al. | |
| 2005/0283364 A1 | 12/2005 | Longe et al. | |
| 2006/0013487 A1 | 1/2006 | Longe et al. | |
| 2006/0018545 A1 | 1/2006 | Zhang et al. | |
| 2006/0025091 A1 | 2/2006 | Buford | |
| 2006/0136408 A1 | 6/2006 | Weir et al. | |
| 2006/0158436 A1 | 7/2006 | LaPointe et al. | |
| 2006/0167689 A1 | 7/2006 | Maren | |
| 2006/0167872 A1 | 7/2006 | Parikh | |
| 2006/0173807 A1 | 8/2006 | Weir et al. | |
| 2006/0190256 A1 | 8/2006 | Stephanick et al. | |
| 2006/0190447 A1 | 8/2006 | Harmon et al. | |
| 2006/0236239 A1 | 10/2006 | Simpson et al. | |
| 2006/0242576 A1 | 10/2006 | Nagel | |
| 2006/0247915 A1 | 11/2006 | Bradford et al. | |
| 2006/0256139 A1 | 11/2006 | Gikandi | |
| 2006/0259479 A1 | 11/2006 | Dai | |
| 2007/0094718 A1 | 4/2007 | Simpson | |
| 2007/0106785 A1 | 5/2007 | Tandon | |
| 2007/0203879 A1 | 8/2007 | Templeton-Steadman et al. | |
| 2007/0216651 A1 | 9/2007 | Patel | |
| 2007/0285397 A1 | 12/2007 | LaPointe et al. | |
| 2008/0034081 A1 | 2/2008 | Marshall et al. | |
| 2008/0072145 A1 | 3/2008 | Blanchard et al. | |
| 2008/0076472 A1* | 3/2008 | Hyatt | 455/557 |
| 2008/0138135 A1 | 6/2008 | Gutowitz | |
| 2008/0154576 A1 | 6/2008 | Wu et al. | |
| 2008/0159841 A1 | 7/2008 | Keller | |
| 2008/0189605 A1 | 8/2008 | Kay et al. | |
| 2008/0195388 A1* | 8/2008 | Bower et al. | 704/243 |
| 2008/0235003 A1 | 9/2008 | Lai et al. | |
| 2008/0244446 A1 | 10/2008 | LeFevre et al. | |
| 2008/0263015 A1 | 10/2008 | Qiu et al. | |
| 2008/0266263 A1 | 10/2008 | Motaparti et al. | |
| 2008/0288665 A1 | 11/2008 | Williams | |
| 2008/0291059 A1 | 11/2008 | Longe | |
| 2009/0037371 A1 | 2/2009 | Unruh et al. | |
| 2009/0055732 A1 | 2/2009 | Motaparti et al. | |
| 2009/0092253 A1 | 4/2009 | Qiu et al. | |
| 2009/0150383 A1 | 6/2009 | Qiu et al. | |
| 2009/0154682 A1 | 6/2009 | Qiu | |
| 2009/0306969 A1* | 12/2009 | Goud et al. | 704/10 |
| 2010/0121876 A1 | 5/2010 | Simpson et al. | |
| 2010/0122164 A1 | 5/2010 | Kay et al. | |
| 2010/0161538 A1* | 6/2010 | Kennedy et al. | 706/47 |
| 2010/0174529 A1 | 7/2010 | Bradford et al. | |
| 2010/0188338 A1 | 7/2010 | Longe | |

FOREIGN PATENT DOCUMENTS

| | | |
|---|---|---|
| CA | 2547143 | 11/2006 |
| CA | 2547143 A1 | 11/2006 |
| EP | 0930760 | 7/1999 |
| EP | 1347361 | 9/2003 |
| EP | 1347361 A1 | 9/2003 |
| EP | 1724692 | 11/2006 |
| GB | 2399202 | 9/2004 |
| WO | 2005036413 | 4/2005 |
| WO | 200680927 | 8/2006 |
| WO | 200680935 | 8/2006 |
| WO | 200834112 | 3/2008 |

OTHER PUBLICATIONS

B.Y.-L. Kuo et al.; "Tag Clouds for Summarizing~eb Search Results" W\~t~ Conference 2007, [Onl'ine] May 8, 2007-May 12, 2007 XP002496297 Banff, Alberta, Canada.

Berhard D.:~Multilingual tern extraction 1,6,7 from domain-specific corpora uS'j ng morphological structure 11th Conference of the European Chapter of the Association for Computational, 2006.

iHEARST M.A , Rosner D.: RTag Clouds 1,6,7 !Data Analysis Tool or Social Signaller? ! <;+St Annual Hawaii Internationt\.L !Conference on System Science, [Online] Jan. 17, 2008,-Jan. 10.

Assadollahi, R; Pulvermu,ller; 2003, Early Influences of Word Length and Frequency: A Group Study Using MEG NeuoReport 14, 1183-1187.

Sam A. Inverso, Nick Hawes, John Kelleher, Rebecca Allen and Ken Haase "Think and Spell: Context-Sensitive Predictive Text for an Ambiguous Keyboard Brain-Computer Interface Speller" Biomedzinische Technik, [online] D vol. 49, No. 1 Sep. 2004.

Tom Stocky, Alexander Faaborg, Henry Lieberman "A Commonsense Approach to Predictive Text Entry" Proceedings of Conference on Human Factors, Apr. 2004.

Pereira et al., Beyond word N-grams. In David Yarovsky and Kenneth Church, editors, Proceedings of the Third Workshop on Very Large Corpora, pp. 95-106, Somerset, New Jersey, 1995.

Berard C., Neimeijer D. Evaluating effort reduction through different word prediction systems. Proceedings of the IEEE International Conference on Systems, Man and Cybernetics, La Haye NL. vol. 3, pp. 2658-2663. Oct. 2004.

Pereira et al., Beyond word N-grams. In David Yarovsky and Kenneth Church, editors, Proceedings of the Third Workshop on Very Large Corpora, pp. 95-106, Somerset, New Jersey, 1995.

Berard C., Neimeijer D. Evaluating effort reduction through different word prediction systems. Proceedings of the IEEE International Conference on Systems, Man and Cybernetics, La Haye NL. vol. 3, pp. 2658-2663. Oct. 2004.

Assadollahi, R., Pulvermu" ller, F., 2003. Early influences of word length and frequency: a group study using MEG. NeuroReport 14,1183-1187.

Jones, P. E., Virtual keyboard with scanning and augmented by prediction, Proc 2nd European Conference on Disability, Virtual Reality and Associated Technologies, (University of Reading, UK, 1998),45-51.

Hollis Weber, "Taming Microsoft Word 2002", 122 pages, published on Oct. 10,2002.

Potipiti, T., Sornlertlamvanich, V., & Thanadkran, K. (2001). Towards an intelligent multilingual keyboard system. Paper presented at the Human Language Technology Conference (HLT 2001), Mar. 18-21, 2001, San Diego.

* cited by examiner

METHOD AND DEVICE INCORPORATING IMPROVED TEXT INPUT MECHANISM

RELATED APPLICATIONS

This application is a continuation-in-part of U.S. application Ser. No. 11/560,668 which was filed Nov. 16, 2006, which in turn is a continuation-in-part of U.S. application Ser. No. 11/131,867 which was filed May 18, 2005; the entirety of both of the preceding applications is incorporated by reference herein.

FIELD OF THE INVENTION

The present invention relates to a device incorporating an improved text input mechanism, a method for improved text input and a computer program for performing the method. More particularly, the present invention relates to a device such as a consumer electronic device, personal digital assistant or cellular telephone which incorporates a context sensitive method for text input based on a user selection of candidates for predicted words of text to be input. The method of the present invention minimizes the number of keystrokes necessary to input text and is particular useful for devices using joysticks, four-way rockers, or direction keys, i.e. having no keys assigned to characters or letters.

BACKGROUND OF THE INVENTION

The use of miniature computers such as personal digital assistants (PDA) and cellular devices capable of text messaging has become increasingly popular. But also portable music players, remote controls, in-car entertainment/information systems and portable electronic games (such as Nintendo's GameBoy or Sony's PlaystationPortable) increasingly utilize text entry functions. Such miniature devices include correspondingly miniature sized input mechanisms. Typically, these devices do not have a full QWERTY-keyboard but only a small set of keys and some software to map multiple key strokes to a conventional letter. The convenience to use such a device crucially depends on the number of keystrokes and hence it is desirable to minimize the number of keystrokes necessary to enter text.

Prior art systems having no letter or character keys and using a rocker move a cursor through a one dimensional (alphabetic) list of letters or through a two dimensional configuration (e.g. mimicking a digit-based phone interface or having arranged the letters in some form of two-dimensional array).

Prior art text input approaches have not sufficiently reduced the number of keystrokes and are only applicable for devices having a keyboard including letter/character keys. Accordingly, what is needed is an improved method for reducing the number of keystrokes necessary to enter text for devices without letter/character keys.

SUMMARY OF THE INVENTION

The present invention implements a system and method for entering text using a prediction based approach. The invention is particular useful for consumer electronics devices that use input means for navigating a cursor such as joysticks, four-way rockers or other input key configurations using direction keys (e.g. "arrow keys" such as up, down, left, right). Optionally, a key for confirming the selection (such as "OK") and keys such as "Cancel", "Clear" or the like can be provided. Such devices comprise, e.g., game consoles (Nintendo GameBoy, Sony Playstation, PlaystationPortable and the like), mobile phones, MP3-players, remote controls for home entertainment systems (DVD-players, setup-boxes, Hifi components, etc.) and in-car entertainment/information systems. The present invention is, however, not restricted to these devices, and applies to all sorts of consumer electronics where it is necessary to enter a text using navigational input means and optionally a confirm button.

The system and method moreover use a predictive text approach for displaying candidate words that the user can select from. The text prediction is preferably a true prediction in that it suggests words before the user has input any information on the intended word. This implies that the text prediction is based on an algorithm that knows what words can follow each other, and it is preferred that this algorithm has the ability to predict words out of the box. This is in contrast to other text prediction approaches that learn to predict words during use. The text prediction of the present invention may rely on pre-existent dictionaries that store transitional probabilities of words, or on grammars that reflect common grammatical constructions of the respective language, or a combination thereof. When the user selects a word, the system will display words that are likely to follow and the user can continue his text input by selecting one of the words to follow. In this way, the user can enter words without having to key in single letters. This is different compared to prior art rocker-based text-entry systems where only individual letters can be selected using the rocker key. The systems and methods according to embodiments of the present invention use single-letter selection only in cases where the intended word is actually unknown to the system, i.e. not listed in the dictionary.

The basic concept underlying the present invention is that items of text (candidates) are predicted based on the preceding word or words of text. The candidates are presented to the user in a two-dimensional user interface schema which allows a selection with minimum number of keystrokes.

Disclosed is a device incorporating a predictive text entry mechanism, a predictive text input method and a computer program for performing the method.

The context sensitive text input method according to the invention comprises the determination of a list of candidates for the present input context. A candidate, e.g. a predicted word, is a possible textual continuation of the present context. The candidates may have relevance scores assigned which indicates how good the candidate fits to the present context. Next, the candidates are arranged in groups, each group having a group designator, e.g. a delimiting character or letter which is common to all candidates in a group. The group designators are displayed and the user is prompted to select a group. Based on the received group selection, candidates of the selected group are displayed. The displayed candidates may then be arranged according to their respective relevance for the present context so that more relevant candidates are displayed first. Preferably, candidates are sorted according to a score assigned to each candidate indicating its relevance. Then the user is prompted to select a candidate from the displayed group. Based on the user selection, the selected candidate is accepted as text input and the context is updated. The process then repeats with the next input. Due to the updated context, a new candidate list and a new candidate grouping is generated. The user interface is therefore dynamic and the displayed items will change depending on the progress of the text input and the respectively updated context.

The invention further relates to a context sensitive text input device. The device comprises a text prediction component for determining a list of candidates for the present input context, a candidate grouping component for arranging the candidates in groups, a display device for displaying the group designators and candidates, and an input device for receiving a user input. The input device may be configured to receive a group selection from the user. The display device may be configured to respond by displaying candidates of the selected group. Displayed candidates may be arranged according to their respective contextual relevance. Preferably, more relevant candidates are displayed such that they can be reached by the user with fewer input keystrokes. The input device may be further configured to receive a candidate selection from the user and to accept the selected candidate as text input. The text prediction component may be further configured to update the context based on the text input and determine an updated list of candidates for the updated context.

According to preferred embodiments, the device may include a display screen for displaying words of data and a user interface for navigating through the candidates, a button or softkey based data entry device for entering data, and/or a processor receiving data from the text entry device and causing it to be displayed on the display screen. Upon activation, the processor may initializes a precursor to a predefined value. The device may be further provided with a non-volatile memory storing at least one dictionary containing a plurality of entries, each such entry including an index, a candidate word, and a score. The relevance of a candidate for a given context may be determined from the word score stored in the dictionary. Alternatively, the relevance of a candidate may be derived from the order in which the entries are stored in the dictionary. For instance, more relevant candidates may be stored ahead of less relevant candidates in the dictionary. Thus, the arrangement of candidates for display may depend on their relative positions in the dictionary. The processor may select a list of n-number of candidate words from the dictionary or the dictionaries whose index matches the precursor (i.e. the context). The processor may cause m-number of candidate words from the list of candidate words to be displayed on the display screen in a specific two dimensional way akin to a menu structure with main menu and sub-menu entries. Preferably, group designators indicating properties of candidates assigned to a group, e.g. their common initial letters are assigned to main menu items. All or a part of the candidates of a group may be assigned to sub-menu items. The processor may cause the display to prompt the user to navigate to and select one of the displayed candidate words or enter a desired word using the data entry device by selecting letters given as entries of the main menu.

DETAILED DESCRIPTION OF THE PREFERRED EMBODIMENTS

The present invention provides an efficient method for inputting text, and is particularly suited for cellular telephones, handheld computers such as personal digital assistants or media players, electronic handheld games, remote controls, and other devices requiring data entry. It is, however, not restricted to these devices and can be applied to other consumer devices as well.

Figure 1:
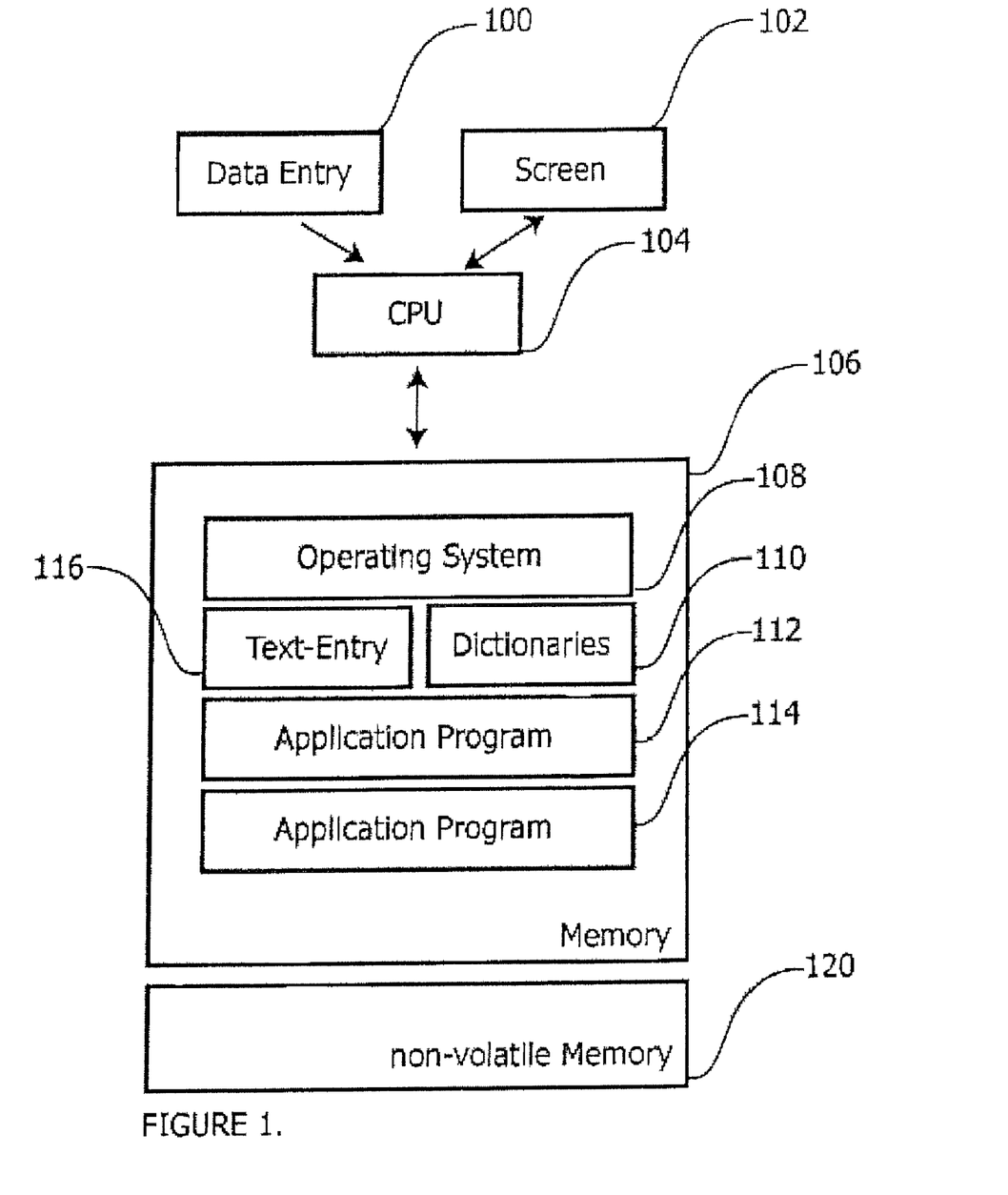
FIG. 1 is a block diagram of a device including the predictive data entry mechanism of the present invention.

FIG. 1 is a block diagram of the operating environment of the present invention.

The system 10 according to an embodiment of the present invention includes an input device 100 which may be a set of buttons, a keypad, a keyboard, a touch sensitive screen or the like which hereinafter will be referred to as keyboard 100. The system 10 further includes a display 102 for displaying the text entered as well as predicted words, the display 102 may be an LCD screen or the like, and in the case of a touch sensitive screen the display 102 may serve a dual purpose both as a display 102 and as the keyboard 100.

As further illustrated in FIG. 1, the system 10 includes a processor or central processing unit (CPU) 104 which executes commands via an operating system 108. The system 10 may include a plurality of application programs 112, an application which displays text 114 and one or more dictionaries 110.

It should be appreciated that the text recognition application 116, the display application 114, and one or more of the dictionaries 110 may be implemented as firmware or microcode stored on a non-volatile memory 120 such as an EPROM, EEPROM or the like. Use of the term "software" throughout this disclosure should be interpreted to include software implemented through firmware and stored on a non-volatile memory medium. The present system may be realized as software or firmware or the like, architecturally located between the operating system 108 of the computer 104 and the application 112 that receives text as input, e.g. a word processor.

The system 10 may be language specific and may have one or more dictionaries or vocabulary modules. The dictionary 110 and keyboard 100 may be language specific. However, the software may allow for switching dictionaries and thus switching languages.

An aspect of the invention relates to its ability to predict the next word that the user will input based on the preceding words or delimiters which will hereinafter be referred to as the context or precursor. It is notable that the context may also arise from the type of application receiving the text or the type of text field receiving the text. In the first case, the application may give a hint to what kind of style the user will use (SMS, short message service: colloquial writing vs. word processor: formal writing). In the second case, some operating systems assign unique identifiers to certain text fields such as "name", "address", etc. This information may be used to activate a different dictionary containing all names, addresses, cities etc.

The system 10 predicts the next word that the user will enter based on the present context by generating a list of likely successor words (candidates), and displays the some or all candidate words for selection by the user. The number of candidate words actually displayed may depend upon the size and resolution of the display (the screen's real estate), and the font size in which the text is displayed. Moreover, the system 10 may optionally be configured to only display candidate words whose score exceeds a threshold value, further limiting the number of candidate words displayed.

Figure 2:
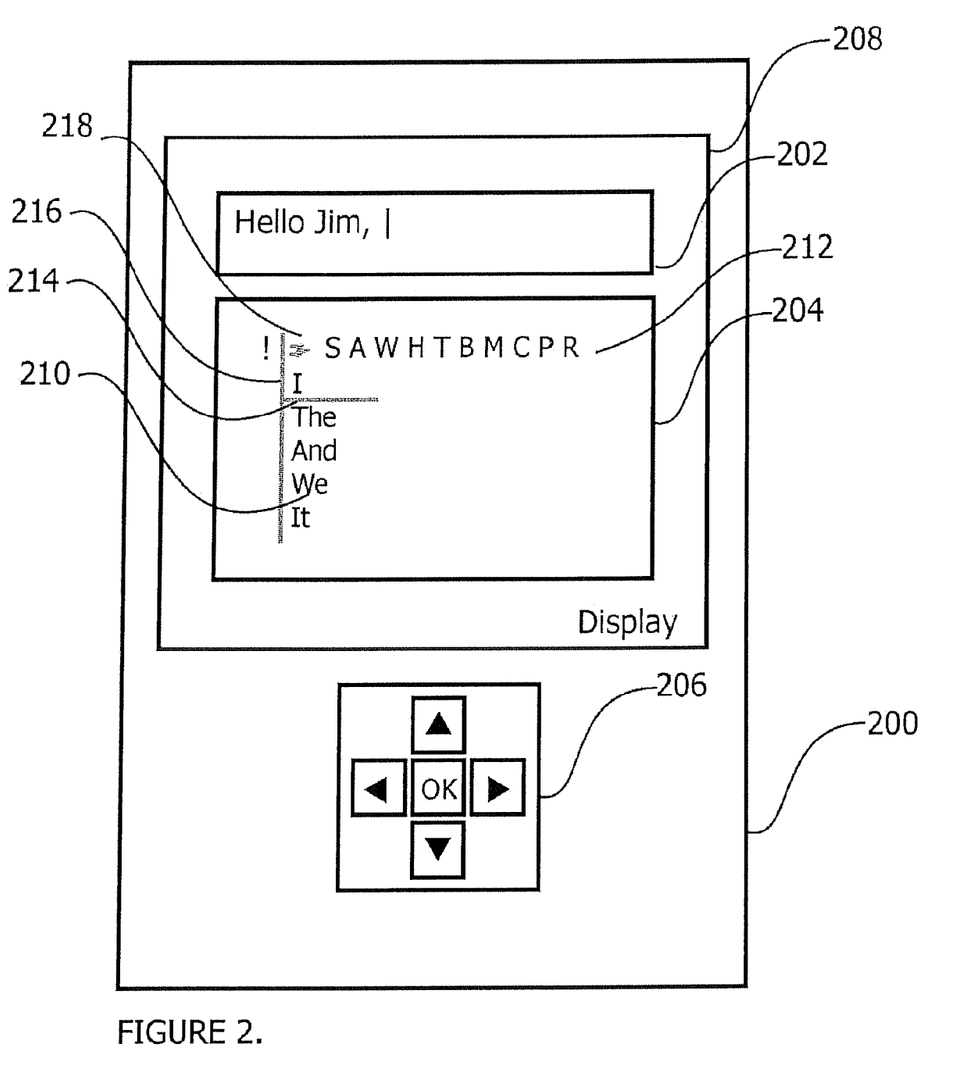
FIG. 2 shows a sample user interface for the predictive data entry mechanism of the present invention.

FIG. 2 is a block diagram of an illustrative user interface 200 for the predictive data entry mechanism of the present invention.

The user interface 200 includes a display 208 having a text edit field 202 showing a text string entered or selected by the user. The display 208 further includes a field 204 displaying a dynamic, two-dimensional arrangement of candidate words.

The input device 206 is configured as navigation input device allowing the user to navigate a cursor 214 in the field 204 for selecting candidate words. For example, the input device comprises a joystick, a four-way rocker key, direction keys, etc. The present invention allows text input by selection of displayed candidate words using the navigation input device, i.e. without character/letter keys, whilst minimizing the number of necessary cursor movements and key strokes.

One of the aspects of the invention is that the arrangement of displayed candidate words is context dependent and thus dynamic. The system 10 predicts candidate words by looking at the immediately preceding word or words which will be termed a precursor. The number of words defining a precursor may vary. It should be understood that the term "word" as used throughout the specification refers to a conventional word of text and to a delimiter such as a space, a period, a comma, a semi-colon and the like.

The system 10 includes at least one dictionary 110 including a list of candidate word entries; each candidate word entry includes an index and a candidate word. It should be understood that a given precursor may have many candidates. Thus, the same index may appear in multiple candidate word entries in the dictionary. For example the precursor "the" is likely to have many candidates. Each candidate word entry further includes a score indicative of the frequency of occurrence and may include other relevant information.

As will be explained below, the dictionary stores a plurality of candidate word entries, each candidate word entry including an index, a candidate word, and a score. The size (measured in words) of the index may vary from entry to entry. Thus the dictionary may store candidate word entries having a one word index, and entries having a two word index, and entries having a three word index, etc. In this manner, the system may use a one word precursor or a two word precursor etc.

The method and system of the present invention will now be explained with reference to a bi-gram or two word embodiment in which the precursor is the immediately preceding word (or delimiter). In a tri-gram embodiment the precursor consists of the two immediately preceding words (or word/delimiter combination). Similarly, a four-gram embodiment the precursor consists of the three immediately preceding words. It should be understood that the teachings of the present invention may be implemented using any number of words in the precursor. The size of the index stored in the dictionary must correspond to the size of the precursor.

The dictionary 110 includes a plurality of candidate word entries; each candidate word entry includes an index, and a candidate word. The index is the key used to access the "candidate" word(s). It should be appreciated that a single precursor may have multiple candidate words. The index is at least one word or delimiter in length, but may consist of two or more words.

According to a bi-gram embodiment, each candidate word entry in the dictionary 110 includes a list of two-word phrases in which the first word is termed the index and the second word is termed the "candidate" word. The precursor is the key or index used to access the "candidate" word(s). It should be appreciated that a single precursor may have multiple candidate words.

As noted above, each entry in dictionary 110 includes a score indicative of the frequency of occurrence, i.e. the frequency in which the user uses the phrase. A given precursor may have multiple candidate words, and the score associated with each candidate word may or may not be the same. Optionally, the score may be a normalized value between 0 and 1.

Each time the user enters (or selects) a precursor, the system 10 searches the dictionary 110 for corresponding candidate words. The system 10 ranks the candidate words according to their score, and displays the candidate words in field 204 as explained below.

The system 10 may treat the initial state (i.e. at the beginning of text input) before any word has been entered in the same way it reacts when the precursor is a delimiter such as a period. In this manner the system 10 may be configured to provide candidate words in the initial state even before the user has entered a first character of the text.

The system 10 may be self-training in the sense that new phrases and their corresponding scores may be dynamically added to the dictionary 110. Moreover, the score of existing phrases may dynamically update to reflect changes in the frequency of usage.

According to a preferred embodiment, the system 10 is provided with a robust dictionary 110 such that the full benefit of the system is immediately available to the user. Moreover, if the system 10 permits the score of existing phrases to dynamically update, then the dictionary 110 will self-optimize to reflect the style, diction, and vocabulary of the user. Thus, even if the dictionary 110 is initially empty, the system 10 will compile its own dictionary reflective of the user's vocabulary, diction and style.

An initial dictionary 110 may be compiled by examining a body of text for x-word phrases, and ranking the frequency of the x-word phrases. In the bi-gram embodiment of the present example x will equal to 2. Ideally the body of text used to compile the dictionary will contain a rich vocabulary and varied examples of style and diction.

The system 10 is especially useful for languages for which it is complex to input words, e.g. Chinese. The system 10 may thus operate on full symbols or on morphemes (one or more morphemes make up a word of a language) or even on syllables (e.g. Hiragana or Katakana in Japanese).

In the aforementioned embodiment, the candidate words are generated using the score associated with each dictionary entry, where the score is indicative of the frequency of use and is statistically generated. However, the candidates can also be generated using grammatical rules. For example, if the system 10 has identified a context in which only a verb can follow, all nouns will be excluded from the candidate list. If, for example, one of the dictionaries is extended to have word classes such as DETERMINER, ADJECTIVE, VERB, NOUN, etc. (these words are capitalized to reflect the word class and not the word itself) associated with words, then the precursor may be defined as a string of word classes. For example, one precursor may be "DETERMINER ADJECTIVE" and have "NOUN" as candidate. In this way, the phrases "the red car" and "a little girl" may be realized within one entry. While there may be a rule that predicts a NOUN after a DETERMINER, there may also be a rule that predicts a NOUN after a DETERMINER followed by an ADJECTIVE. This rule would predict "car" and "girl" after "a little". To determine a precursor, even more complex analyses may be performed rather than a mere mapping of word forms to word classes.

According to a further refinement of the present embodiment, the system may refresh or update the candidate list in response to character(s) entered by the user. More particularly, the system responds to the user's entry of the first letter of the desired word by displaying only those candidate words whose initial letter corresponds to the entered letter, i.e. filtering the candidate list. In this case the candidate words are selected in accordance with the precursor and the characters entered by the user.

It is important to appreciate that the aforementioned refinement is significantly different from prior art disambiguation methods. The prior art methods simply lookup words in a conventional alphabetic dictionary whose initial letter(s) correspond to those entered by the user. Since the conventional dictionary is not context driven, the system will display words which do not fit the context. In fact the system will respond with the same list of words each time the user enters a given letter, regardless of the context.

In contrast, according to an embodiment of the present invention selects candidate words based on the context (precursor). The list of candidate words are ordered according to the score and only the top m words are displayed. The aforementioned refinement narrows the list of candidate words by selecting only those candidate words whose initial letter(s) correspond to those entered by the user. Thus the refinement makes the score a secondary sort key rather than the primary key. Most importantly, the present system will provide suggestions for words following the word just entered. Thus, there will be candidates for the next word although no key stroke has occurred. The prior art only assists the user complete the current word. The present invention predicts the word following the current word.

Optionally, the processor will dynamically adjust the size of the precursor to ensure that the system obtains a desired number of candidate words. Thus, if the system retrieves too few candidate words, it can dynamically reduce the size (in words) of the precursor. Alternatively, if the processor retrieves too many candidate words, it can dynamically increase the size (in words) of the precursor. In other words, if the number of candidate words retrieved is a threshold number of words greater than the number of words which may be displayed on the screen, then the processor can dynamically increase the size of the precursor. For instance, the processor may shift from a bi-gram which uses a one word precursor to a tri-gram which uses a two word precursor, i.e. the two words which immediately precede the word to be entered.

Optionally, the dictionary 110 may include a list of individual words (candidate words without an associated precursor) and their respective score in addition to the aforementioned x-word phrases. These single word entries will be termed orphan words. As will be explained below, these orphan words are used to supplement the candidate words when the number of candidate words falls below a pre-defined threshold number. For example, if there is only one candidate word for a given precursor, the system 10 may display one or more of the orphan words.

Obviously, it is desirable to have a full complement of candidate words in order to provide a reasonable number of selections from which to choose. According to one embodiment, empty slots in the candidate list may be filled by orphan (one-gram) words in decreasing order of frequency. Words that already appeared due to bi-gram frequencies will be excluded from the fill-up items.

The embodiments and refinements discussed above were explained with reference to a single dictionary 110. However, the present invention may be implemented using multiple dictionaries 110 without departing from the scope of the invention. For example, a first dictionary 110 may be used to store single word (one-gram) entries and their respective scores, and a second dictionary 110 may be used to store two-word (bi-gram) phrases and their respective scores. Alternatively, the system 10 may include a fixed, pre-defined dictionary 110 and a user-defined dictionary 110. Thus the concept of the invention may be extended to include any number of dictionaries. Also, as mentioned above, different dictionaries may be used for different receiving applications or different text fields As computing power is generally limited in portable devices it may be useful to keep the dictionaries 110 in different tables. Generally, a one-gram table/dictionary will be smaller than a bi-gram dictionary and thus can be searched faster. However implementation details do not change the scope of the invention, and one of ordinary skill in the art will appreciate that there are different possibilities to implement the dictionaries and their access.

One aspect of the present invention comprises a two dimensional user interface for navigating through an arrangement of displayed candidate words. A description of how the list of candidates is dynamically translated to this arrangement is given in the following, followed by a description how the user can navigate and select words.

Sorting and Arranging of Candidates in a User Interface Menu

Since the aforementioned prediction algorithm may include pre-existing dictionaries, the candidate list can comprise a large number of words, e.g. more than 10.000 candidates. For devices that do not have keyboards with letter/character keys to restrict the list by simply clicking a letter, the interface has to be very efficient. Since the top candidates are the most likely to be selected by the user, these words are preferably presented to the user in a dedicated list for easy access. To also make available the rest of the list, there should be a further means for presenting additional candidates. According to an aspect of the invention, the candidates are arranged in groups, the groups ranked according to some relevance criteria, and the candidates presented to the user according to their group arrangement. Preferably, the groups are arranged in a menu structure with group designators as main menu items and the candidates as sub-menu items According to an embodiment, the candidate list is transformed into groups of words, for instance such that the words in a group each begin with the same letter or letters. Next, the sizes of the groups are determined by counting the number of words in them, and the groups are ranked according to their sizes. Note that words within a group retain their relative order that they had in the full candidate list. This would mean that the words in a group are sorted according to their relevance. For example, if the word "simple" was ranked higher in the candidate list than the word "simply", and both words are grouped into a group of words all starting with the letter "s", then "simple" will still be ranked higher within the group than "simply".

Alternatively, the ranking of the groups can also be done according to the initial letter or letters in the alphabet so that a group containing words starting with "a" would rank higher than a group containing words starting with "b". While the first alternative (ranking according to group sizes) maximizes the efficiency of selecting a desired word (by reducing the number of clicks), the second alternative (ranking according to initial letters) allows for intuitive use of the alphabet.

A third alternative is to rank the groups according to the overall score that the words in the group have. This would mean that the group would rank highest that has the most members with the highest word scores (e.g. word frequencies) rather than (as described in the first alternative) the group with the highest number of members. The overall score of a group may be calculated by adding the individual scores of the group members.

A fourth alternative implements a fixed order of groups according to global frequencies of all or initial letters of the words in the group (i.e. irrespective of the words in the group and their frequencies, and thus irrespective of the candidate list). This represents a trade-off as the order has more efficiency than a group ranking according to the alphabet but still requires no dynamic arrangement of the groups (i.e. less cognitive friction for the user). For instance, when groups are generated according to the word initials, the groups are sorted according to the general frequency of use of word initials (not only for the actually assigned candidates, but globally for the initial letters of words in general).

It is noteworthy that the grouping algorithm may also be applied only to the top h words of the candidate list in order to save computing power. That is the candidate list may be first sorted and pruned in order to reduce the number of candidates before the grouping of the candidates.

It is also noteworthy that the grouping can be done with or without respect to casing (i.e. one embodiment can have words starting with "R" and "r" in a single group, a different embodiment may assign the words to two different groups).

Next, a two dimensional user interface menu (212, 210) is constructed and displayed to allow the user to select a displayed word or letter. In the standard position 218 of the menu, the top k words of the candidate list are shown as a sub-menu (i.e. words arranged in a vertical fashion 210) for a first main menu item designating the best candidates for the present context. This is done to give the user direct access to the top k words irrespective of their initial letter or letters. This sub-menu is arranged such that the user can select words listed in it with minimal interaction (i.e. minimum number of keystrokes).

The main menu is displayed on the horizontal axis 212. Other main menu items are displayed on the right hand side of the first main menu item 218. These main menu items refer to the current distinguishing letter of the groups as group designators. In the beginning of a word selection process, distinguishing letters are the initial letters, i.e. the letter that the words within a group have in common (distinguishing letters will be explained in more detail below). As in one embodiment the groups themselves are ranked according to the size of the groups, the second main menu item has a letter assigned that designates the group that has the most candidates in it. If word frequency was taken into account during ranking of the groups (as described in the third alternative above), then the group with the best set of candidates (apart from the top k words assigned to the first main menu item 218) would rank highest and its main menu item would be displayed in second position.

As mentioned before, groups of words are arranged along the main menu according to their score or the alphabet or other ranking criteria. The main menu items designate the distinguishing letter. The ordering of the menu items allows for shortening the way that the vertical cursor 214 has to travel and hence reduces the number of clicks that the user needs in average for his selection.

The user can now navigate through the menu structure by using the navigation buttons 206: By pressing left and right buttons, he can move the vertical part 216 of the cursor to navigate to the main menu items, while he can move to sub-menu items using the up-/down-buttons. The horizontal part 214 of the cursor will move accordingly. When having positioned the cursor at the desired word, the user can press the OK button to confirm his selection.

According to an embodiment, the horizontal cursor 210 by default activates the first item of the selected sub-menu. Thus, for the top k list of the candidates (arranged in the first main menu item 218), the cursor will activate the most probable word in the present context. Here, activating means indicating a menu position where the system knows which item to copy to the text input field 202 if the user presses the OK button 206. If this word is in fact the desired word, the user can select it using just one click, i.e. by pressing only the OK button. Accordingly, in the other main menus items designating word groups, the horizontal part 210 of the cursor will activate the first (i.e. most relevant) member of the group.

The whole menu is completely dynamic as it changes the main menu items 212 as well as the sub-menu items 210 according to the user's actions (i.e. the actual context). If the user moves the cursor to a main menu that he expects to contain a desired word but the sub-menu doesn't show it, then the user can move the horizontal part 214 of the cursor up and activate the letter (group designator) of the main menu 212 itself. If the user pushes the OK button afterwards, then this letter is entered in the text input field 202 and a new round of sorting and arranging of candidates is performed. But before that, the previous candidate list is filtered by the letter just selected so that only words conforming to the selection are listed in the following candidate list.

This means that only candidates prevail that start with the letter just selected. The following grouping of candidates may then be done based on the letter following the letter just selected. In other words, the candidate words are grouped according to the letters in the next letter position in the words. Initially, the grouping was based on the first letter position. After one letter is selected by the user, the words are grouped based on the second letter position and so on. The main menu items will then display letters designating this letter which is then the distinguishing letter (the filtering before caused that all remaining words in the candidate list will start with the letter just selected, it would thus makes no sense to display this letter).

The repeated application of this procedure actually has two implications: a) the original candidate list is progressively reduced to candidates that start with the letters successively entered by using letters of the horizontal main menu 212; and b) if the word the user intends to type is not in the candidate list at all, then the full word can be typed by using the letters of the main menu 212.

To ensure that words can be entered by selection of single letters, the system may generate main menu items covering all letters of the alphabet (possibly including a blank), even if in a current situation the size of the corresponding group would be zero (i.e. there are no words in the candidate list that contain this letter at this current position). Letters that are artificially added (i.e. with zero members in the grouping) may be arranged according to their frequency of use.

According to an embodiment, the system can include a rule to restrict the number of group members (i.e. candidate words) shown on the display to a certain number. Imagine, a group would have 200 words starting with "s". Then it would make more sense to enter another distinguishing letter rather than to scroll down the vertical menu 210. This rule may also be applied to constrain the computing power needed to work with large candidate lists.

To exemplify the text entry mechanism and give more details, the invention is now described from the user's view when entering a sentence.

Visual Structure of the Menu System

The user interface architecture 204 according to an embodiment of the present invention is two-dimensional. The user can navigate a cursor along a horizontal line 212 in a main menu. The main menu items are assigned to candidate groups and labeled with group designators. For some or all main menu items on the horizontal line, there are sub-menus structured vertically 210. The sub-menu items (e.g. candidate words) are arranged depending on the horizontal main menu items that describe more global properties of items placed on the respective vertical sub-menu. For example, there might be a letter "A" on the horizontal menu 212 that designates a group of words starting with the letter A. Available words starting with the letter A would be displayed on a vertical line (column). For the selection of a candidate, the user may move the cursor (vertical part 214) along the vertical line by using the respective keys of the navigation input device 206 (e.g. the up-/down-keys). Thus, the entire text input is based on the operation of navigation inputs, such as direction keys. This makes the invention particularly useful for devices having a limited keyboard comprising only navigation inputs, such as a joystick or arrow keys, and an optional Enter/OK button.

To further reduce visual complexity, sub-menu items may only be displayed when the vertical part of the cursor 216 is standing at the respective main menu item on the horizontal line 212.

In one embodiment of the invention, sub-menu items on vertical lines are arranged in a way that the most probable item occurs on the top of the item list. In this way, the user needs less clicks/cursor movements to actually select the item. Preferably, the items in the main menu and/or the sub-menu are arranged according to the likelihood that the menu item is selected by the user for text input.

According to an embodiment, the horizontal line of the user interface main menu structure is structured in three parts:

On the left, there is a special item that designates special characters that are used in sentences such as the full-stop, comma, semicolon, question marks and the like. The aforementioned group of marks (e.g. ".", ";", "!", "?", etc.) are displayed on the vertical sub-menu when the cursor is positioned on the special item in the horizontal main menu. The order of the characters may be dynamic (e.g. top most is a full stop near the end of a sentence or a comma within a sentence), or static (i.e. in a fixed order).

Next, there is a menu item 218 that designates the group of top k current candidates in the present context. The vertical sub-menu under this item carries words that can start with different letters. These words all have in common that they fit the present context very well because they are the top k items of the candidate list, i.e. the most likely successors of the present context. The candidates are generated depending on the present context by the prediction component of the system.

The third part of the horizontal main menu structure comprises items that correspond to distinguishing letters occurring in candidate words (group designators). The distinguishing letters designate the corresponding word groups which may be selected by horizontally moving the cursor to the respective main menu item. The distinguishing letters can indicate the initials of candidate words, but in other situations also a letter in the j-th position of the candidate words.

It is conceivable to add other items to the left (or right) hand side of the menu, such as a special item for deleting the last letter, the last word, or other relevant actions, such as setting font type to bold face, adding the new word, sending the message, etc.

In the present embodiment, the cursor consists of two parts:
1. a vertical line 216 that is positioned at a horizontal main menu item to indicate the user where in the main menu he is; and
2. a horizontal (214) part (semi-transparent rectangle as in FIGS. 3A-3G or a line as in FIG. 2) marking the currently activate item of the vertical sub-menu when the cursor is moved down from the main menu item.

However, one of ordinary skill in the art will appreciate that indicating selected menu items can be done in many various ways without leaving the scope of the invention. Moreover, one of ordinary skill in the art will appreciate that the whole menu structure may be rotated in order fit different user interface designs.

General Scheme of Interaction with the System

In general, more global menu items (e.g. letters designating groups) are placed on the horizontal axis 212 in the main menu whereas sub-menus are put on the respective vertical axis 210. The user navigates through the menus using arrow keys and selects an item using a confirmation button (e.g. "OK" or "select"), henceforth called "OK" button, by using the input system 206.

Figure 3A:
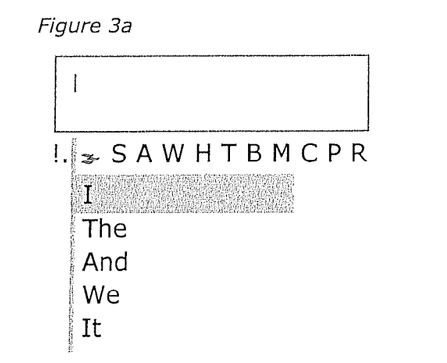
FIGS. 3A-3G are examples illustrating the operation of the invention for displaying and selecting candidate words.
Figure 3B:
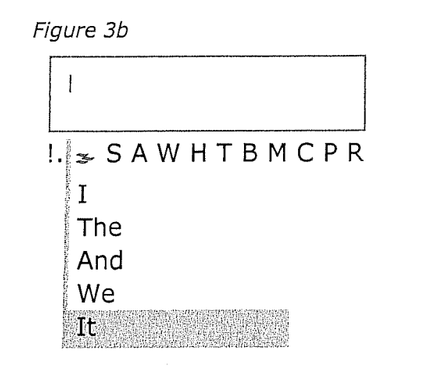
Figure 3C:
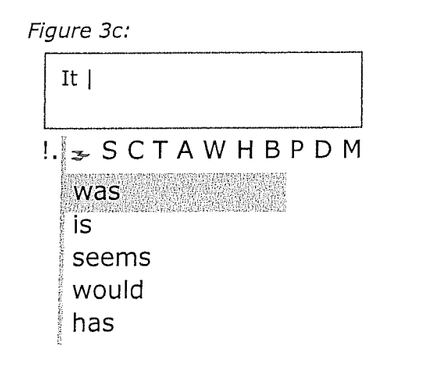
Figure 3D:
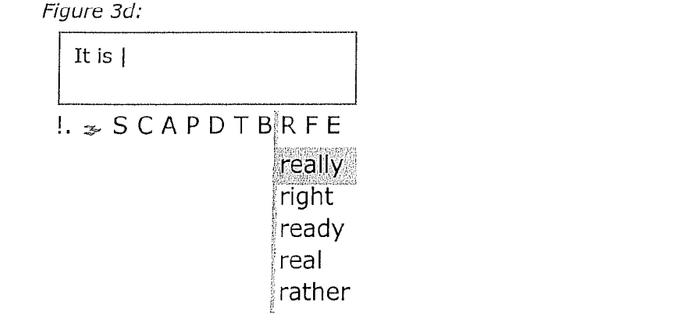
Figure 3E:
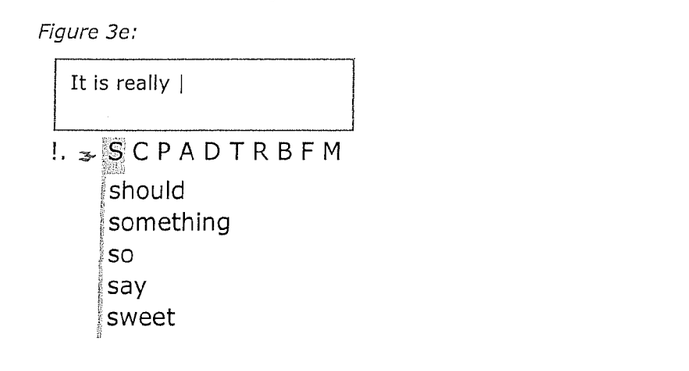
Figure 3F:
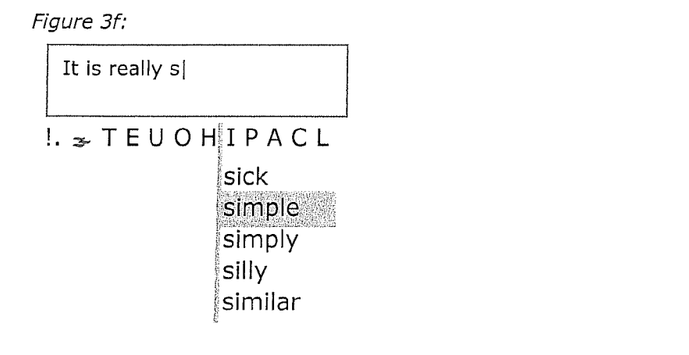
Figure 3G:
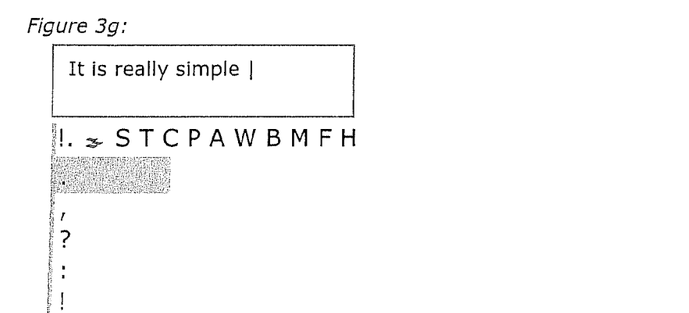

The operation of the invention is explained in the following based on an example. Consider entering the sentence "It is really simple!" in the FIGS. 3A-3G:

a) The currently best candidate words for the present context (here the beginning of a new sentence) are displayed in a vertical column 210 of the user interface 204 designated by a symbol 218 (here: ☞) on the horizontal main menu 212. The cursor (light grey) is initially positioned on the first word of the vertical candidate list and activates this item. This is the standard position when the text field is empty or a word has just been selected. The user can then move the cursor by using the arrow keys and confirm a candidate by hitting "OK". The word is then copied to the text field 202 and a blank is added.

b) The user moves down to the word "It" and selects the word using the "OK" button. Every time the user actually selects or enters a word, the system will compute a new candidate list (as the context has changed), select and arrange a new menu structure (as the candidates and groups will be new ones). The cursor is set back to its standard position, which is the position ☞(218) in the horizontal main menu (thus indicating the top k candidates irrespective of their initial letter) and on the first word of the vertical candidate list. In the best case (i.e. if always the first respectively predicted best candidate word is the intended one), the user can enter a full sentence by just clicking the "OK" button and without moving the cursor at all.

c) Upon selecting a word, the top k possible candidates are shown on the vertical candidate list below the ☞-item 218 in the horizontal menu list. The user can now select "is" from the vertical candidate list. Note that the letters on the horizontal line assigned to the main menu items have changed from selecting the word "It" to "is". Here, the letters are the initials of appropriate followers arranged in groups. In this embodiment, the order of the main menu items reflects the probability by which the next word will start with the respective letter. These probabilities depend on the list of candidates, generated by the prediction component, and the candidate list depends on the present context. The presentation of menu items in a dynamic, context sensitive way further reduces the number of clicks that the user needs to reach the intended word. In other embodiments, the list of letters in the main menu may take an alphabetical order or other orders.

d) For example, the word "really" is not in the top k words of the candidate list of the previously selected word "is" presented below the ☞-item 218. Thus the user moves the cursor to the letter "R" on the right hand side. Here, currently appropriate words beginning with "R" or "r" are presented. The user can now select "really".

e) In the rare case where the intended word is not among the displayed candidates (e.g. because not all candidates are displayed for display size restrictions, i.e. the candidate groups are pruned before display), the user can activate a distinguishing letter by going up (i.e. moving the cursor to the horizontal main menu item) and hitting the "OK" button. The system will then constrain all candidates in subsequently presented menus to those that have that letter (with or without respect to case) in the current distinguishing position. In the present example the user selects "s".

f) In this example, the system then displays the initial "s" in the text input field 202, and the list of letters in the horizontal menu is updated to the letters that frequently follow "s" (again, this list may be computed dynamically, thus depending on the structure of the current candidate list and the resulting new groups). The user can then move to the corresponding letter and select the word from this list. In the example, the user moves to the "I" and all appropriate followers starting with "si" are displayed.

g) Finally, the user moves the cursor left to get to the punctuation mark main menu item and selects the exclamation mark. If a punctuation mark is selected, a "pretty print" algorithm removes the last blank added after the last word. As mentioned before, there may be additional main menu items on 212 for deleting letters or words.

User testing revealed that users need on average only 1.55 clicks for entering a letter when using the user interface of the present invention. On the standard PlayStation Portable interface users need 10.3 clicks per letter: the present invention thus performs 664% better than the standard interface.

Of course, the horizontal menu 212 can comprise more letters than the display is able to show. The present embodiment could thus move the whole menu to the left and show the next horizontal item ("scroll") if the cursor hits the display's right border. Similarly, the vertical menu 214 can comprise more candidate words than the display is able to show and a vertical scrolling may be provided.

Note, that the user can also enter entirely new words by using the letter items in the horizontal menu 212. The new words may be added to the system's dictionary automatically. In this case, hitting the "OK" button will also add a blank (" ") after the word automatically. In other embodiments, there may be a special item on the horizontal menu 212 to indicate the end of a word.

In languages that do not use the Latin characters, like Chinese or Japanese, there may be different items arranged on horizontal list. In Japanese, for example, the may be syllable symbols from Hiragana or Katakana or in Chinese there may be so-called atoms of characters following the Wobuzixing standard of classifying simplified and traditional Chinese characters. One of ordinary skill in the art will appreciate that there are other methods for other languages to display subparts of words on the horizontal menu.

Although the invention has been described by way of specific examples, it is not limited to those examples and many variations may be applied to the text prediction and user interface design. Accordingly, variations in and modifications to the method, system and its use will be apparent to those of ordinary skill in the art, and the following claims are intended to cover all such modifications and equivalents.

The invention claimed is:

1. Context sensitive text input method, comprising the steps of:
determining a list of candidate words for the present input context, a candidate word being a possible textual continuation of the present context;
wherein the present context comprises at least one preceding word or delimiter;
arranging the candidate words in groups, each group having a group designator; displaying the group designators;
prompting the user to select a group and receiving the user selection;
displaying candidate words of the selected group, the displayed candidate words being arranged according to their respective contextual relevance;
prompting the user to select a candidate word and receiving the user selection; and
accepting the selected candidate word as text input and updating the context.

2. Method of claim 1, wherein the list of candidate words is determined by a predictive text method predicting likely continuations of the present context, the predictive text method assigning a relevance score to each candidate word which indicates the likelihood that the candidate word follows the present context of previous input(s).

3. Method of claim 2, wherein the predictive text method uses word frequencies to calculate the probability that a candidate word follows the words in the present context.

4. Method according to claim 1, wherein the candidate words of the selected group are arranged for display corresponding to the likelihoods that candidate words fit to the present context.

5. Method according to claim 1, wherein the candidates words of the selected group are sorted according to candidate scores indicating their contextual relevance, and the candidate words are arranged according to their respective scores such that candidate words having a better score are displayed for allowing a selection with less user inputs.

6. Method according to claim 1, wherein the group designators and the candidate words of the selected group are arranged in a two-dimensional structure, the group designators listed in one dimension and the candidate words of the selected group listed in the other dimension.

7. Method of claim 6, wherein, for displaying, the group designators are arranged horizontally and the candidate words of the selected group are arranged vertically.

8. Method according to claim 1, wherein more relevant candidate words of the selected group having a better score are arranged closer to the group designator of the selected group.

9. Method according to claim 1, wherein the candidate words are words and a group designator is a letter that the words in the group have in common, in particular initial word letters.

10. Method according to claim 9, wherein the common letter is at a particular position in the words of the group.

11. Method according to claim 1, wherein the candidate words are grouped according to common letters or letter sequences, in particular initials.

12. Method according to claim 1, comprising the step of receiving a selection of a group designator from the user, wherein upon a selection of a group designator, the candidate list is filtered to include only words matching the letter associated with the selected group designator.

13. Method according to claim 1, wherein the group designators are arranged for display according to the group sizes of the corresponding groups.

14. Method according to claim 1, wherein the candidate words are grouped according to their initial letters and the group designators are arranged for display according to the alphabetic order of the initial letters of the words in the groups.

15. Method according to claim 1, wherein the group designators are arranged for display according to the overall score of the candidate word associated with the respective group.

16. Method according to claim 1, wherein the top most relevant candidate words are arranged in a separate group.

17. Method according to claim 1, comprising the steps of: sorting the candidate list according to the candidate scores; and pruning the candidate list to include only the candidate words having the best scores.

18. Context sensitive text input device, comprising:
- a text prediction component for determining a list of candidate words for the present input context, a candidate word being a possible textual continuation of the present context; wherein the present context comprises at least one preceding word or delimiter;
- a candidate grouping component for arranging the candidate words in groups, each group having a group designator; a display device for displaying the group designators and candidate words; and
- an input device for receiving a user input; wherein the input device is configured to receive a group selection from the user and the display device is configured to respond by displaying candidate words of the selected group, the displayed candidate word being arranged according to their respective contextual relevance;
- wherein the input device is further configured to receive a candidate selection from the user and to accept the selected candidate word as text input; wherein the text prediction component is further configured to update the context based on the text input and determines an updated list of candidate words for the updated context.

19. Device of claim 18, wherein the display device is configured to display the present text context and/or the accepted text input.

20. Device of claim 18, comprising a candidate sorting and arranging component for sorting the candidate words of the selected group according to their respective relevance scores and arranging the candidate words of the selected group for display on the display device such that candidate words having a better score are displayed closer to their corresponding group designator.

21. Device according to claim 18, wherein the input device is a navigation input device allowing the control of a cursor on the display, in particular a rocker-key, joystick, or direction keys.

22. Device according to claim 18, comprising a cursor control component for controlling the display of a cursor based on user input received from the input device, the cursor being configured to allow selection of a group designator and/or a candidate word by being moved to the respective displayed item, the cursor highlighting the selected item when positioned accordingly.

23. Device of claim 22, wherein the cursor control component is configured to position the cursor in an initial position when text input starts and/or after a text input is accepted, the initial cursor position highlighting the candidate word having the best overall score.

24. Device according to claim 22, wherein the input device comprises an OK or Enter key for confirming the selection of a candidate word being highlighted by the cursor.

25. Device according to claim 18, comprising a menu control component for controlling a user interface menu displayed on the display device, the user interface menu comprising a main menu and sub-menus which are displayed when the corresponding main menu item is selected, the main menu comprising the group designators and the sub-menus comprising the candidate words of the respective groups.

26. Computer program product stored on a computer readable medium for causing a processor to perform the method according to claim 1 when the computer program instructions are executed by the processor.

27. Method according to claim 1, wherein a navigation input device is used to move a displayed cursor to a group and to move the displayed cursor to a displayed candidate word.

28. Method according to claim 27, wherein left/right and up/down buttons of the navigation input device are used to move the displayed cursor.

29. Device according to claim 21, wherein left/right and up/down buttons of the navigation input device are used to move the cursor on the display.

* * * * *